United States Patent [19]

Varrasso

[11] 3,730,695
[45] May 1, 1973

[54] LEVEL CONTROL MEANS FOR GLASS FIBER MAKING PROCESS

[75] Inventor: Eugene C. Varrasso, Heath, Ohio
[73] Assignee: Owens-Corning Fiberglas Corporation
[22] Filed: Mar. 23, 1971
[21] Appl. No.: 127,268

[52] U.S. Cl. ............................65/2, 65/11 R, 65/29, 65/161, 73/304 R, 137/392, 340/244 C
[51] Int. Cl. ..................................................C03b 37/02
[58] Field of Search .....................65/2, 11 R, 11 W, 65/29, 160, 161, 164; 340/244 C; 73/304 R; 137/392

[56] References Cited

UNITED STATES PATENTS

| | | |
|---|---|---|
| 1,961,893 | 6/1934 | Wadman et al. ...............65/164 X |
| 3,012,373 | 12/1961 | Willis ...............................65/161 X |
| 3,520,638 | 7/1970 | McUmber et al. ............137/392 X |

*Primary Examiner*—Robert Lindsay, Jr.
*Attorney*—Staelin & Overman and Myron E. Click

[57] ABSTRACT

The invention is illustrated in a preferred embodiment for producing glass fibers in which the maintenance of a preselected head of a molten body of glass is critical in the control of fiber diameter and fiber quality. The feeder contains a molten body of glass and has orifice means formed therein for issuing molten streams of glass. The molten streams of glass are attenuated into glass fibers. A glass melter replenishes the body of molten glass in the feeder as molten glass is withdrawn from the feeder and formed into glass fibers. A probe is disposed for contact with the molten body of glass in the feeder. A source of electrical energy is connected to the probe and the molten body of glass to establish a potential difference between the probe and the molten glass. Current flow in the probe is detected and a detection voltage is supplied proportional to the detected current flow. A bucking voltage is supplied which has a magnitude substantially equal to the magnitude of the detection voltage when the probe is initially touched by the body of molten glass in the feeder. The detection and bucking voltages are compared to provide a level signal which is a measure of the level of the molten body in the feeder. The rate of replenishment of the molten body from the glass melting unit is responsive to the magnitude of the level signal.

11 Claims, 3 Drawing Figures

INVENTOR.
EUGENE C. VARRASSO
BY
ATTORNEYS

LEVEL CONTROL MEANS FOR GLASS FIBER MAKING PROCESS

BACKGROUND OF THE INVENTION

This invention relates generally to liquid level measurement and control, and is more particularly directed to a method and means for electrically detecting, measuring, and regulating the level of fluid material such as molten glass in fiber forming units.

As is well known, the maintenance of an exacting level of liquid material within a container is extremely important in many manufacturing operations, both for maintenance of operating stability of processing equipment involved, and often more importantly for maintenance of quality products produced.

The manufacture of glass fibers for textile strands and yarns is one manufacturing process requiring such control, and one of the processes to which the present invention is particularly adaptable. By way of example, the manufacture of continuous glass fibers by mechanical attenuation for textile products involves the withdrawal of molten glass from a container while the molten material is maintained at a constant temperature. The orifices of such container of molten glass are usually located on the underside of the container and are subjected to the head of molten material thereabove. Upon withdrawal of material from the orifices, the head of the material is an important factor determining the diameter of the fibers being attenuated. The maintenance of a constant level or constant head of material above the orifices therefore plays an important part in determination of the uniformity of diameters of the plurality of fibers produced, as well as end to end diameter of each such fiber.

In view of the ever increasing demand for such fibers, and their wide range of use for industrial purposes, the tolerances, or tolerable range of variation for general use has been constantly narrowed. With the advent of processes and apparatus for manufacturing glass fibers of very small diameters, sometimes called Beta fibers, the diameters of the fibers are so small that a variation thereof from a desired diameter is even more noticeable and thus the tolerable range of diameter variation has been reduced significantly. To establish production of such fibers on a constant basis it becomes necessary, besides exercise of exacting temperature and viscosity controls, that the head of the liquid be also exactingly controlled to practically negligible variations in level.

Level control means have been introduced in the prior art for effecting level control in glass fiber manufacturing and is exemplified in U. S. Pat. No. 3,012,373, issued Dec. 12, 1961. The liquid level detector disclosed in the referenced patent included a probe adapted for connection to a source of electrical energy. The probe was fixedly disposed for contact with the surface of the molten glass with the tip of the probe stationary and it was designed to have the tip partly submerged in the liquid at all times. The electrical current flowing in the probe was measured to indicate variation in the area of contact of the molten glass with the probe tip to correspondingly indicate the level of the liquid with respect to the probe.

The above described level detector worked satisfactorily with the processes and apparatus for manufacturing glass fibers at that time, and still works satisfactorily for the applications for which it was designed. However, new processes and apparatus have been introduced for the manufacture of glass fibers, particularly the very small diameter glass fibers, which use molten bodies having a much hotter temperature and in which a much greater throughput is utilized to obtain fibers having a smaller diameter and a greater production rate. Since the resistances of the hotter glasses vary substantially from the resistances of those molten bodies previously utilized, and since the throughput rate is substantially greater for the newer processes, the liquid level detector described in the above referenced patent tends to operate as an off-on type of control which permits the glass level to cycle up to the probe and then away from the probe. This not only varies the head substantially, but disturbs the thermal stability of the bushing and the melter feeding the bushing.

Accordingly, it is an object of the present invention to provide an improved method and apparatus for level control.

It is another object of this invention to provide an improved method and means for exactly controlling the level of material in liquid form within a container.

It is another object of the invention to provide a method and means for controlling the level of molten glass in the production of glass fibers, which control can accommodate the different temperatures of molten glass and the different throughputs involved in the various glass fiber manufacturing processes.

SUMMARY OF THE INVENTION

In carrying out the above objects, the invention features in the preferred embodiment shown a liquid level detector which includes a probe disposed for contact with the surface of a liquid and means for connecting a source of electrical energy to establish a potential difference between the probe and the liquid. The current flow in the probe is detected and a detection signal proportional to the detected current flow is supplied. A fixed bucking signal is supplied which is opposite in character to the detection signal. That is, if the detection and bucking signals are direct current signals the bucking signal is opposite in polarity to the detection signal. If the bucking signal and the detection signal are alternating current then the bucking signal is opposite in phase to the detection signal. Which ever choice of signal is utilized the provision of one signal opposite in character from the other enables the simplest addition or comparison of the two signals. The bucking signal is provided with a magnitude which is preferably equal to the magnitude of the detection signal when the probe initially touches the surface of the liquid to establish a reference point for the detection signal and a glass level point with respect to the probe above which more effective control may be obtained. The bucking signal thus compensates for the initial decrease in resistance from infinity to some low finite value.

Measuring means are provided for receiving the detection and bucking signals and providing a level signal which is a measure of the level of the liquid with respect to the probe when the probe is immersed in the liquid. The measuring means includes a summing circuit for providing an output proportional to the difference in magnitude between the bucking and detection signals. A phase detector circuit is responsive to the differential signal received from the summing circuit to discriminate between the signal characteristics of the detection and bucking signals and provide a direct current output which has a polarity related to the characteristic of the signal that dominates to enable selective control of the rate of feed of replenishing material.

The summing circuit may be an operational amplifier having an adjustable feedback to control the gain thereof. The bucking signal supplying means may include means for adjusting the magnitude of the bucking signal. The feedback adjustment and the bucking signal adjustment may be mechanically linked to require the gain of the amplifier to be a specific reciprocal function of the magnitude of the bucking signal. This enables a single mechanical adjustment of both of the quantities to reduce operator error during installation or operation of the detector.

Other objects, advantages, and features of the invention will become apparent when the following description is taken in conjunction with the accompanying drawings, in which:

FIG. 3 is another schematic-diagrammatic illustration of an arrangement for producing fibers from molten glass wherein the level control of the present invention is utilized to supply raw material to a feeder-melter combination in solid form.

DESCRIPTION OF THE PREFERRED EMBODIMENT

It will be understood that although the invention as herein described and illustrated is disclosed in conjunction with and is particularly useful with glass fiber forming operations, the invention has broader application and is adaptable to measurement and control of the level of practically any electrically conducting material, even those having extremely small electrical conducting properties.

Figure 1:
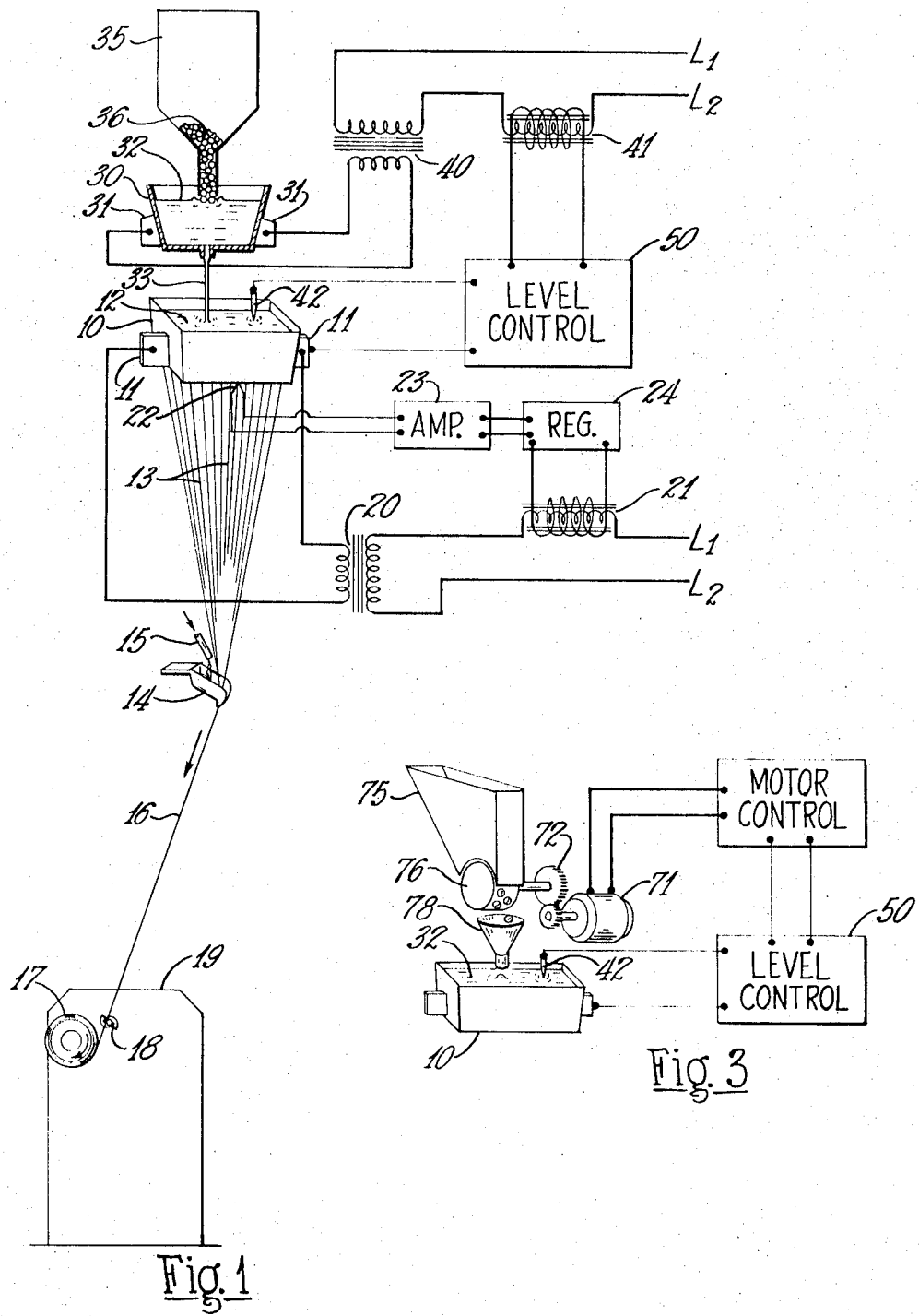
FIG. 1 is a schematic-diagrammatic illustration of the arrangement of apparatus for producing glass fibers wherein the liquid level of the glass in the feeder from which the fibers are attenuated is controlled by the electrical probe arrangement of the present invention.

Referring to the drawings in greater detail, FIG. 1 shows a molten glass feeder 10 containing a molten body of glass 12 which is supplied with heat and maintained at a uniform temperature by direct passage of electrical current through the feeder by way of power connections to its oppositely disposed terminals 11. Continuous fibers 13 are attenuated from orifices in the bottom of the feeder 10 and are gathered together into a strand 16 by passage over a gathering member 14. The fibers are supplied with sizing fluid at the gathering means from a supply tube 15 connected to a source of such sizing material (not shown). The successively formed portions of the strand 16 are thereupon wound into a package 17 by winder 19 as the strand is caused to traverse the package by a traverse mechanism 18.

The heating current of the feeder or bushing 10 is alternating current supplied over a main power supply line by way of conductors L1 and L2. The power source, for example, may be a 440 volt, 60 cycle source. The alternating current is supplied to the feeder through a transformer 20 which reduces the voltage, for example, to a value in the order of two volts, which is capable of providing heating current in the order of one of more kilo-amperes since the feeder is made of low resistance high temperature metal such as platinum or a platinum alloy. The primary loop of the power circuit of the feeder 10 contains a saturable core reactor 21 which acts as a variable impedance to permit adjustment of the current flow through the feeder for the temperature desired. The saturable core reactor is cooperatively associated with a thermocouple 22 attached to the feeder to sense and generate an electrical signal corresponding to the feeder temperature.

The thermocouple 22 is connected to an amplifier 23 which amplifies the temperature signal supplied from the thermocouple to a regulator 24. The regulator in turn supplies direct current to the saturable reactor 21 to modify the impedance offered by the reactor in the primary of the feeder power circuit to provide automatically a desired feeder temperature. When the temperature of the feeder tends to rise above a value preselected by adjustment at the regulator 24, the direct current supplied from the regulator to the saturable core reactor 21 is reduced, thereby enlarging the impedance offered by the reactor 21 and diminishing the current flow in the secondary or feeder loop. If the temperature of the feeder tends to drop below the preselected value, the regulator acts to supply additional direct current to the reactor 21, thereby reducing the reactor impedance and increasing the current flow in the secondary loop for a rise in temperature in the feeder 10. The feeder thereby is maintained at a relatively fixed temperature.

The molten body 12 in the feeder 10 from which the fibers 13 are attenuated is replenished with molten materials supplied from an orificed premelting unit 30 disposed above the feeder or bushing 10. The premelting unit is electrically heated by passage of electrical current therethrough from its terminals 31 which are connected to an electrical energy source through a power transformer 40 by conductors L1 and L2. The molten body 32 within the premelting unit is a meltdown of solid quantities of the material fed thereto, such as marbles 36 supplied from a funnel means 35. The marbles may be supplied in bulk form and fed to the molten body 32 at a rate determined by the melting rate corresponding to the magnitude of electric current flowing through the unit 30. The more current flowing from the premelting unit 30, the greater is the rate of consumption of marbles from the hopper or funnel arrangement 35 and, correspondingly, the faster is the rate of supply of molten material therefrom in the form of a stream 33 flowed through the orifice in the bottom of the premelting unit.

Figure 2:
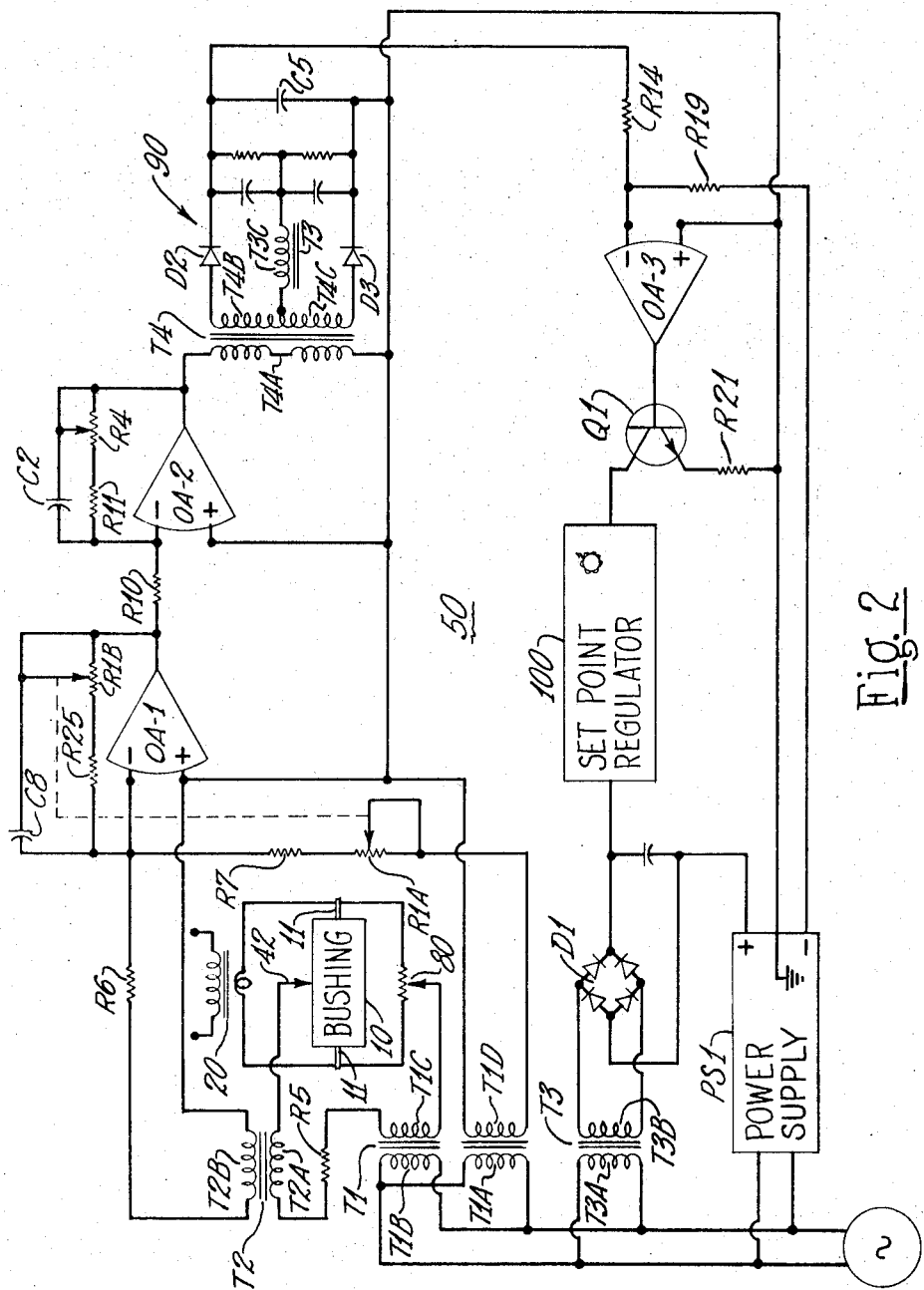
FIG. 2 is a schematic circuit diagram illustrating the function and arrangement of components for effecting the control and functions desired in the teachings of this invention.

According to the present invention the rate of flow of the material in the stream 33 to the body 12 is matched to the rate of withdrawal of molten material from the body 12 by continuous modulation provided by a level control circuit indicated generally at 50. The control 50 regulates the current flow in and the melting rate of the premelter unit 30. A level signal supplied by the level control unit 50 is connected to a saturable core reactor 41 in the primary of the power circuit for the premelter 30. A control signal provided by the level control unit 50 alters the impedance offered by the saturable core reactor 41 to control the supply of electrical energy through the transformer 40 to the premelter 30 in the manner discussed hereinbefore with respect to the control of the application of electrical energy to the feeder or bushing 10. Referring to FIG. 2 the details of the level control unit 50 are illustrated.

A power supply for the control circuit 50 supplies alternating current to the primary windings T1A and T1B of a transformer T1. A secondary winding T1C of the transformer T1 provides a source for applying a potential difference between a glass level probe 42 and the body of glass 12 in the feeder 10. The secondary winding T1C is connected in series with the resistor R5, a primary winding T2A of the transformer T2, the probe 42, and a null detector adjustable resistor 80. Since the transformer 20 is supplying alternating heating current to the terminals 11 of the bushing 10, it is desirable to connect the probe circuit so that only current flows therein that is supplied by the secondary winding T1C. Accordingly, an adjustable null resistor 80 is connected across the terminals 11 and the tap thereof is moved until a zero output or potential appears between the probe 42 and the tap of the resistor 80 when no voltage is being applied by the secondary winding T1C.

The current flowing in the probe circuit is detected by the transformer T2 which has a secondary winding T2B connected in series with a resistor R6. When the probe 42 touches or is immersed in the molten glass, current will flow through the probe 42 which is detected by the transformer T2 causing a current flow in resistor R6. A voltage appears across resistor R6 which is proportional to the magnitude of the current flowing in the probe 42.

A bucking signal or voltage is supplied by the secondary winding T1D of the transformer T1 causing current flow in a resistor R7 and a bucking voltage adjustment potentiometer R1A. The magnitude of the bucking signal is adjusted by the potentiometer R1A and is selected to match the magnitude of the detection signal appearing across resistor R6 when the probe 42 touches the surface of the molten body of glass. The secondary winding T1D is connected with respect to the secondary winding T1C so that the bucking signal is opposite in phase to the detection signal so that it can be easily subtracted therefrom. If a direct current modification of the circuit is being utilized, the polarity of the bucking signal would be selected to be opposite the polarity of the detection signal, readily enabling subtraction of the bucking signal from the detection signal.

An operational amplifier OA-1 is connected to receive and sum the detection and bucking signals and provide an output proportional in magnitude to the difference between the two signals. The gain of the operational amplifier OA-1 is controlled by a feedback circuit which includes a resistor R25 and a potentiometer R1B connected in series between the output of the operational amplifier OA-1 and the input thereof, and connected in parallel with the capacitor C8. The gain of the amplifier OA-1 is controlled by an adjustment of the potentiometer R1B. Power supply connections for amplifiers OA-1, OA-2, and OA-3 have been omitted to simplify the drawing for the purposes of clarity.

The output of the operational amplifier OA-1 may be fed to a second operational amplifier OA-2 through a resistor R10 to further amplify the signal. The operational amplifier OA-2 also includes a feedback circuit through resistors R11 and potentiometer R4 connected in series between the output of the amplifier OA-2 and the input thereof, and in parallel with the capacitor C2. The gain adjustment by modifying the resistance of the potentiometer R4 may be used to provide a gain trim or a fine gain adjustment for the system of the two amplifiers OA-1 and OA-2.

The output of the amplifier OA-2 is fed to a phase detector circuit indicated generally at 90. The phase detector circuit includes a transformer T4 having a primary winding T4A and secondary windings T4B and T4C. The output of the secondary windings T4B and T4C is connected respectively through the diode rectifiers D2 and D3. A secondary winding T3C of a transformer T3 is utilized as a reference voltage to provide a phase detection with respect to the supply voltage for the control unit. As noted on the left hand side of the figure a primary winding T3A of the transformer T3 is connected across the alternating supply voltage to enable the phase comparison of the detector circuit 90. Comparison of the phase sense of the alternating current signal from the amplifier OA-2 is processed through the phase sensitive detector 90 and the RC circuits associated with the diodes D2, D3 to provide a positive direct current output when the detection signal exceeds the bucking signal, and to provide a negative direct current output when the bucking signal exceeds the detection signal. This output appears across the output capacitor C5 of the detector 90 and is forwarded through resistor R14 to a third operational amplifier OA-3.

The summing junction of the amplifier OA-3 is biased to a negative DC level by the power supply PS1 through the resistor R19. The bias supply through resistor R19 is sufficient to drive the amplifier OA-3 to provide a maximum or near maximum output to a current pump transistor Q1, when there is a zero output from the detector 90. As noted hereinbefore the magnitude of the bucking signal has been selected to be substantially equal to the magnitude of the detection signal when the probe just touches the surface of the glass. Therefore, when the probe 42 is just touching the surface of the glass, the net input to the amplifier OA-1 is zero and thus the output of the phase detector 90 will be zero. When the output from the detector 90 is zero or is a negative quantity, then the output of the amplifier OA-3 should be at its maximum to increase the rate of replenishment to the bushing 10 to the highest level to initially fill the feeder or, in the case of a system upset, to get the glass back to the measuring area on the probe 42.

The output of the amplifier OA-3 is connected to the base of the current pump transistor Q1 to control current flow between the emitter and collector thereof. Control current for the regulator 100 is supplied from the power supply PS1 through a rectifier bridge D1 and from a secondary winding T3B of the transformer T3, which is also connected to rectifier D1. The double connection of the power through the rectifying bridge D1 provides a driving source which will supply a current to the regulator 100 in a magnitude desired, even though the regulator 100 may have a substantial internal resistance. The load current flows from the rectifier bridge D1, through regulator 100, through the emitter-collector circuit of the transistor Q1, and through a current limiting resistor R21 to ground or common.

Although a set point regulator 100 has been shown in FIG. 2 as a generic type of control, the driving capabilities of the level detection circuit shown in FIG. 2 are sufficient to control other means utilized to control the application of heating current to the premelter 30.

Operation of the level control circuit 50 is similar to previous level control circuits in that a fixed voltage is applied to the probe 42 and the resultant current flow therethrough is measured to obtain a level signal. When the probe current alone was utilized as a level signal control, and the surface of the glass initially touches the tip of the probe, the resistance in the probe circuit is reduced from infinity to some finite smaller value as determined by the resistivity of the molten glass which is determined by glass temperature and composition. In prior art fiber operations the resistance of the glass was substantially larger because the fiber forming temperatures were significantly smaller than those in use today. Further, glass compositions have changed to permit the attenuation of fibers having much smaller diameters and different strength characteristics than those previously manufactured. Accordingly, when the current was detected in the probe and applied directly as a signal, the contact of the glass with the tip of the probe resulted in the change of resistance from infinity to a much smaller resistance value than had been previously encountered. The jump in current applied to the amplifier controlling the temperature of a premelter resulted in saturation of the amplifier and a loss of control. Thus the previous controls operating on the detection signal alone tend to act as simple off-on controls which causes the glass level to cycle between the bottom tip of the probe and some lower level.

In the circuit shown in FIG. 2 a bucking voltage is supplied which is equal in magnitude and opposite in polarity or phase to the detection signal when the probe touches the glass. Thus, instead of a large surge of current from the control mechanism the contact of the probe with the glass results merely in establishing a reference or a zero point of the level of the glass with respect to the probe. The magnitude of the bucking signal may be larger than that from the probe when the probe initially touches the glass. This results in the establishment of the zero reference point somewhat higher above the probe tip. But since it is desirable to be able to use all of the tapered tip area as a measuring range, the tip-touching magnitude is preferred.

As the glass level rises on the probe the detection signal becomes larger than the bucking signal and appears as an increasing direct current output signal from the detector 90 to the amplifier OA-3. As the output from the detector 90 increases, the effect of the bias to the amplifier OA-3 through resistor R19 is decreased and thus the output of the amplifier OA-3 is decreased. The decrease inoutput from the amplifier OA-3 is translated by the current pump transistor Q1 into a signal which causes the rate of replenishment of the molten body to decrease. The output from the current pump Q1 may then be compared with a set point signal which corresponds to a desired level of the glass in the feeder 10 so that the glass is maintained substantially at a constant level or desired level to maintain the desired head for fiber formation.

It has been established experimentally that as the molten glass level rises in a bushing or feeder and just touches the probe tip, the measured resistance in the probe in the glass will be between 10,000 ohms and 200 ohms for most molten glasses used in the fiber making processes. The resistance will vary depending upon the temperature of the molten glass, with higher temperatures producing lower resistances, and with the composition of the glass as noted hereinbefore. As the molten glass rises around the probe, the resistance will decrease by a ratio of approximately 4 to 1 for a rise of 0.100 inch in level with the tapered tip design of the probe utilized in the experiment, and as fully disclosed in the above referenced patent.

As also noted hereinbefore operation of the level detector is based upon applying a fixed voltage to the probe and measuring the resultant current flow therethrough after contact with the molten glass. To utilize the measuring system disclosed in FIG. 2 most effectively, the gain of the amplifier OA-1 should be such as to raise the voltage across the secondary T2B of the detection transformer T2 to a predetermined magnitude for the maximum input from the probe circuit (depending upon the parameters of the measuring system) after the bucking voltage supplied by secondary T1D has been subtracted.

An analysis of the system may be made through the establishment of values for the probe-glass resistance when the probe just touches the glass surface, the probe-glass resistance with the probe immersed 0.100 inch in the molten glass, the reflected input resistance to the operational amplifier OA-1, the voltage applied to the probe, the detection transformer ratio, and by requiring that the bucking and detection voltages be of canceling magnitudes when the probe initially touches the molten glass.

The relationship between the gain needed and the bucking voltage magnitude shows a specific reciprocal nature. Therefore by mechanically linking the adjustment of these two quantities the two parameters can be controlled by a single mechanical adjustment, reducing operator error when the level detector is in operation or being initially installed.

The reciprocal relationship may be maintained in FIG. 2 by mechanically linking the adjustable tap of the bucking voltage resistance potentiometer R1A and the adjustable tap of the feedback resistance potentiometer R1B of the amplifier OA-1. Rotation of a single shaft driving the two potentiometers will then provide the proper adjustment of both the gain of the amplifier and the magnitude of the bucking voltage for the temperature and/or composition of a molten body of a particular glass in the feeder 10.

Once a steady state operation has been reached if the level of glass body 12 reaches a height above the standard desired level, then the current flow in the probe increases in amount proportional to the rise in level above the desired level. The increased current flow appears as an increased output from the detector 90, reduces the output from the operational amplifier OA-1, and increases the impedance of the saturable core reactor 41 in the power circuit of the premelter 30. The temperature of the premelter 30 is thus proportionally reduced to increase the viscosity of the body 32 and thereby correspondingly reduce the quantity flowing in the stream 33. With the reduced flow of material in the stream 33 the level in the body 12 is thus lowered until the standard desired level is reestablished.

Should the level of the body 12 tend to fall below the desired head, the resistance of the probe loop begins to approach infinity corresponding to the level dropping below the probe tip. The probe current and correspondingly the signal supplied from the detector to the amplifier OA-3 is reduced to cause a proportional increase in the current supplied to the saturable core reactor 41, thereby allowing proportionally more current to flow through the premelter 30 and a greater volume of material to flow in the stream 33. The rate of melting is increased, acting to raise the level of the body until the standard desired level is established.

If the system is sufficiently upset for some reason so that the glass level in the feeder falls below the tip of the probe 42, then the rate of replenishment is driven to its maximum rate of supply and when the glass level again rises to the tip of probe 42 the use of the bucking signal will enable the glass level to be increased to its desired standard level without operating the level control system as an on-off control device.

Although the invention has been described above in relationship to modulation of flow of material to a molten body there is illustrated in FIG. 3 another arrangement whereby the principles of the present invention may be applied to modulation of a supply of solid material to a molten body. Referring to FIG. 3 solid matter in the form of marbles is supplied to the molten body 32 through a funnel or guide tube 78. The marbles are contained in a hopper having an associated rotary feeder 76. The rate of supply of marbles from the hopper to the molten body is established by the rotational speed of a motor 71 which is geared through a speed reducer 72 to the rotary feed mechanism 76. The probe 42 may be utilized in the feeder circuit as shown to control the rate of feed of marbles to the feeder 10.

When the level of the molten body being monitored falls below a predetermined desired height determined by the probe position, the current flow in the probe loop is reduced by reasons of the reduced area of interfacial contact of the molten material with the probe tip. The reduced current flow is arranged to cause a corresponding increase in voltage at the rotary drive 71. This results in an increase in speed of the rotary feeder 76 and a corresponding increase in the rate of feed of material, faster than the rate of withdrawal from the molten body.

Should the level of the body increase above the predetermined height, the regulator reduces the voltage at the drive 71 as determined by the signal from control unit 50 so that the rate of feed of solid material to the body is reduced.

The taper of the probe is found to be desirable in view of the more rapid increase in area of contact it offers, upon rises in level of contacted fluids, from the point to the base of the tip. This, in turn, provides a greater variation in resistance or degree of contact with the molten body as the level varies in a given amount. A cylindrical or other configuration of tip will also operate according to the principles of the invention, but with less sensitivity than the cone since the variation of area of contact of the probe with given variations in level of the body measured will not be as rapid as with a tapered tip probe.

In conclusion, it is pointed out that while the illustrated examples constitute practical embodiments of my invention, I do not limit myself to the exact details shown since modification of these details may be made without departing from the spirit and scope of this invention.

I claim:

1. Apparatus for producing glass fibers in which the maintenance of a preselected head of a molten body of glass is critical in the control of fiber diameter, comprising
   a. feeder means containing a molten body of glass and having orifice means formed in a wall thereof for issuing at least one stream of molten glass,
   b. means for attenuating the molten stream of glass into a glass fiber,
   c. means for replenishing said body of molten glass in said feeder means as molten glass is withdrawn from said feeder means and formed into a glass fiber,
   d. probe means disposed for contact with the molten body of glass in said feeder means,
   e. means for connecting a source of electrical energy to said probe means and said molten body of glass to establish a potential difference between the probe means and the molten glass,
   f. means for detecting current flow in said probe means and supplying a detection voltage proportional to the detected current flow,
   g. means for supplying a separate bucking voltage having a predetermined magnitude and which is opposite in character to said detection voltage,
   h. means for summing said detection and bucking voltages and providing a level signal which is a measure of the level of the molten body in said feeder means, and
   i. means responsive to said level signal for controlling the replenishment of the molten body from said replenishment means.

2. Apparatus as defined in claim 1 in which said bucking voltage is substantially equal in magnitude to the magnitude of said detection voltage when said probe means initially touches the body of molten glass.

3. Apparatus as defined in claim 1 in which
   a. said replenishment means comprises a glass melting means heated by electrical energy, and in which
   b. said replenishment controlling means includes means responsive to said level signal for regulating the electrical energy applied to said glass melting means to regulate the flow of molten glass therefrom to said feeder means.

4. Apparatus as defined in claim 1 in which
   a. said replenishment means includes means for feeding unmelted glass to a melter, and in which
   b. said replenishment controlling means includes means responsive to said level signal for regulating the feed rate of said unmelted glass feeding means.

5. Apparatus as defined in claim 1 in which
   a. said electrical energy source for said probe means supplies an alternating potential, and b. said bucking voltage supplying means supplies an alternating voltage opposite in phase to the resultant detection voltage.

6. Apparatus as defined in claim 5 in which said summing and signal providing means includes phase detector means for discriminating between detection and bucking voltages to provide said level signal.

7. Apparatus as defined in claim 6 in which
   a. said replenishment means includes means for replenishing molten glass at a rate at least equal to the maximum rate of molten glass withdrawal from said feeder means, and
   b. said replenishment controlling means is responsive to an increasing level signal from said phase detector means to decrease the rate of replenishment.

8. Apparatus as defined in claim 1 in which
   a. said feeder means is heated by a second source of electrical energy, and which further includes
   b. means for establishing the electrical center of said feeder means with respect to said probe means so that no current will flow in said probe means from said second source of electrical energy, and
   c. means for connecting said probe electrical energy source between said probe means and the electrical center of said feeder means.

9. The method of maintaining a preselected level of a contained body of molten glass from which molten glass in continuously removed and to which material is fed continuously in replenishment, comprising
   a. partially immersing the tip of an electrically conducting probe in the molten glass below said preselected level,
   b. establishing a difference of electrical potential between said probe and body of molten glass,
   c. detecting current flow through said probe and providing a detection voltage proportional to said current flow,
   d. supplying a bucking voltage equal in magnitude to the detection voltage when said tip just touches the surface of said body of glass,
   e. subtracting said bucking voltage from said detection voltage to obtain a level signal related in magnitude to the depth which said probe is immersed in said molten body,
   f. establishing a desired level for said body corresponding to a given magnitude of level signal, and
   g. utilizing level signal deviations from said given magnitude of level signal to regulate the feed of glass to said molten body to retain the level of the molten body substantially constant.

10. The method of claim 9 which further includes
    a. feeding glass in a molten condition from a melting unit to said contained body of molten glass, and
    b. varying the temperature and viscosity of the glass in said melting unit in response to level signal variations in order to vary the rate of feed from the melting unit to the contained body of molten glass.

11. The method of claim 9 which further includes
    a. feeding glass from a melting unit to said contained body of molten glass,
    b. feeding unmelted glass to said melting unit, and
    c. varying the rate of feeding said unmelted glass to melting unit in response to variations of said level signal in order to vary the rate of feed of molten glass from the melting unit to said contained body of molten glass.

* * * * *